(12) United States Patent
Deishi

(10) Patent No.: US 7,187,387 B2
(45) Date of Patent: Mar. 6, 2007

(54) IMAGE PROCESSING APPARATUS CAPABLE OF CREATING A DITHER MATRIX PROVIDING IMPROVED IMAGE QUALITY

(75) Inventor: Satoshi Deishi, Osaka (JP)

(73) Assignee: Minolta Co., Ltd., Osaka (JP)

( * ) Notice: Subject to any disclaimer, the term of this patent is extended or adjusted under 35 U.S.C. 154(b) by 288 days.

(21) Appl. No.: 10/673,272

(22) Filed: Sep. 30, 2003

(65) Prior Publication Data

US 2004/0217972 A1 Nov. 4, 2004

(30) Foreign Application Priority Data

Apr. 30, 2003 (JP) ............................. 2003-125670

(51) Int. Cl.
*G09G 5/02* (2006.01)
(52) U.S. Cl. ...................................... 345/596
(58) Field of Classification Search ........ 345/596–599; 348/574; 358/3.13, 3.14, 3.15, 3.16, 3.17, 358/3.18, 3.19, 175 FOR
See application file for complete search history.

(56) References Cited

U.S. PATENT DOCUMENTS

| 4,866,534 A | * | 9/1989 | Tada ........................ 358/3.07 |
| 6,111,658 A | * | 8/2000 | Tabata ...................... 358/1.9 |
| 6,439,682 B1 | * | 8/2002 | Kakutani ................... 347/15 |
| 6,538,771 B1 | * | 3/2003 | Sakatani et al. ............ 358/2.1 |

FOREIGN PATENT DOCUMENTS

| EP | 647058 A2 | * | 4/1995 |
| JP | 64-29170 | | 1/1989 |
| JP | 5-244400 | | 9/1993 |
| JP | 10-16664 | | 6/1998 |
| JP | 10262151 | * | 9/1998 |
| JP | 2001-111830 | | 4/2001 |
| JP | 2001111829 | * | 4/2001 |
| JP | 2002-125122 | | 4/2002 |
| JP | 2003-87567 | | 3/2003 |

\* cited by examiner

*Primary Examiner*—Kee M. Tung
*Assistant Examiner*—G. F. Cunningham
(74) *Attorney, Agent, or Firm*—Buchanan Ingersoll & Rooney PC

(57) ABSTRACT

In an image-processing employing a dither matrix a basic dither pattern is formed of a set of a plurality of basic patterns each including a plurality of pixels. In a single basic pattern a single pixel is assigned 1 serving as a number indicating an order followed to illuminate a dot in the dither matrix. When basic dither patterns are arranged longitudinally and laterally a location remotest from any pixel assigned a number is selected and a pixel at that location is assigned a subsequent number. This series of operations is repeated. When there is no basic pattern that is not assigned a number, in basic pattern a number indicating an order followed to illuminate a dot is assigned to allow the dither matrix to a dither matrix of dot convergence type. Thus a dither matrix allowing an image processing apparatus to satisfactorily reproduce an image can be created.

23 Claims, 24 Drawing Sheets

| LEVEL | DITHER PATTERN THRESHOLD |
|---|---|
| 1 | 0 |
| 2 | 2 |
| 3 | 15 |
| 4 | 25 |
| 5 | 30 |
| 6 | 32 |
| 7 | 35 |
| 8 | 37 |
| 9 | 39 |
| 10 | 40 |
| 11 | 41 |
| 12 | 42 |
| 13 | 43 |
| 14 | 44 |
| 15 | 45 |
| 16 | 46 |
| 17 | 47 |
| 18 | 48 |
| 19 | 49 |
| 20 | 50 |
| 21 | 51 |
| 22 | 52 |
| 23 | 53 |
| 24 | 54 |
| 25 | 55 |
| 26 | 56 |
| 27 | 57 |
| 28 | 59 |
| 29 | 61 |
| 30 | 63 |
| 31 | 65 |
| 32 | 67 |
| 33 | 69 |
| 34 | 71 |
| 35 | 73 |
| 36 | 75 |
| 37 | 77 |
| 38 | 79 |
| 39 | 81 |
| 40 | 83 |
| 41 | 85 |
| 42 | 87 |
| 43 | 89 |
| 44 | 92 |
| 45 | 94 |
| 46 | 96 |
| 47 | 99 |
| 48 | 101 |
| 49 | 103 |
| 50 | 106 |
| 51 | 108 |
| 52 | 111 |
| 53 | 113 |
| 54 | 116 |
| 55 | 118 |
| 56 | 121 |
| 57 | 123 |
| 58 | 126 |
| 59 | 128 |
| 60 | 131 |
| 61 | 133 |
| 62 | 136 |
| 63 | 139 |
| 64 | 141 |
| 65 | 144 |
| 66 | 147 |
| 67 | 149 |
| 68 | 152 |
| 69 | 155 |
| 70 | 158 |
| 71 | 160 |
| 72 | 163 |
| 73 | 166 |
| 74 | 169 |
| 75 | 171 |
| 76 | 174 |
| 77 | 177 |
| 78 | 180 |
| 79 | 183 |
| 80 | 186 |
| 81 | 189 |
| 82 | 192 |
| 83 | 195 |
| 84 | 197 |
| 85 | 200 |
| 86 | 203 |
| 87 | 206 |
| 88 | 209 |
| 89 | 212 |
| 90 | 215 |
| 91 | 218 |
| 92 | 222 |
| 93 | 225 |
| 94 | 228 |
| 95 | 231 |
| 96 | 234 |
| 97 | 237 |
| 98 | 240 |
| 99 | 243 |
| 100 | 247 |
| 101 | 250 |
| 102 | 253 |
| 103 | 256 |
| 104 | 259 |
| 105 | 263 |
| 106 | 266 |
| 107 | 269 |
| 108 | 272 |
| 109 | 276 |
| 110 | 279 |

FIG.8

| | | | |
|---|---|---|---|
| 111 | 282 | 167 | 484 |
| 112 | 286 | 168 | 488 |
| 113 | 289 | 169 | 492 |
| 114 | 292 | 170 | 496 |
| 115 | 296 | 171 | 500 |
| 116 | 299 | 172 | 504 |
| 117 | 302 | 173 | 508 |
| 118 | 306 | 174 | 512 |
| 119 | 309 | 175 | 516 |
| 120 | 313 | 176 | 519 |
| 121 | 316 | 177 | 523 |
| 122 | 319 | 178 | 527 |
| 123 | 323 | 179 | 531 |
| 124 | 326 | 180 | 535 |
| 125 | 330 | 181 | 539 |
| 126 | 333 | 182 | 543 |
| 127 | 337 | 183 | 547 |
| 128 | 340 | 184 | 551 |
| 129 | 344 | 185 | 555 |
| 130 | 347 | 186 | 559 |
| 131 | 351 | 187 | 563 |
| 132 | 354 | 188 | 567 |
| 133 | 358 | 189 | 571 |
| 134 | 362 | 190 | 575 |
| 135 | 365 | 191 | 579 |
| 136 | 369 | 192 | 583 |
| 137 | 372 | 193 | 587 |
| 138 | 376 | 194 | 591 |
| 139 | 379 | 195 | 595 |
| 140 | 383 | 196 | 599 |
| 141 | 387 | 197 | 603 |
| 142 | 390 | 198 | 607 |
| 143 | 394 | 199 | 611 |
| 144 | 398 | 200 | 615 |
| 145 | 401 | 201 | 619 |
| 146 | 405 | 202 | 624 |
| 147 | 409 | 203 | 628 |
| 148 | 412 | 204 | 632 |
| 149 | 416 | 205 | 636 |
| 150 | 420 | 206 | 640 |
| 151 | 424 | 207 | 644 |
| 152 | 427 | 208 | 648 |
| 153 | 431 | 209 | 652 |
| 154 | 435 | 210 | 656 |
| 155 | 439 | 211 | 660 |
| 156 | 442 | 212 | 664 |
| 157 | 446 | 213 | 669 |
| 158 | 450 | 214 | 673 |
| 159 | 454 | 215 | 677 |
| 160 | 458 | 216 | 681 |
| 161 | 461 | 217 | 685 |
| 162 | 465 | 218 | 689 |
| 163 | 469 | 219 | 693 |
| 164 | 473 | 220 | 697 |
| 165 | 477 | 221 | 702 |
| 166 | 481 | 222 | 706 |

FIG.9

| | |
|---:|---:|
| 223 | 710 |
| 224 | 714 |
| 225 | 718 |
| 226 | 722 |
| 227 | 726 |
| 228 | 731 |
| 229 | 735 |
| 230 | 739 |
| 231 | 743 |
| 232 | 747 |
| 233 | 751 |
| 234 | 756 |
| 235 | 760 |
| 236 | 764 |
| 237 | 768 |
| 238 | 772 |
| 239 | 776 |
| 240 | 781 |
| 241 | 785 |
| 242 | 789 |
| 243 | 793 |
| 244 | 797 |
| 245 | 801 |
| 246 | 806 |
| 247 | 810 |
| 248 | 814 |
| 249 | 818 |
| 250 | 822 |
| 251 | 827 |
| 252 | 850 |
| 253 | 900 |
| 254 | 1000 |
| 255 | 1100 |
| 256 | 1152 |

DENSITY DETECTION PATTERN

| DENSITY DETECTION PATTERN | BASIC DITHER PATTERN |
|---|---|
| A | 80 |
| B | 200 |
| C | 500 |
| D | 800 |
| E | 1153 |

FIG.19

| LEVEL | DITHER PATTERN THRESHOLD | LEVEL | DITHER PATTERN THRESHOLD |
|---|---|---|---|
| 1 | 0 | 1 | 0 |
| 2 | 5 | 2 | 3 |
| 3 | 13 | 3 | 5 |
| 4 | 14 | 4 | 8 |
| 5 | 16 | 5 | 10 |
| 6 | 17 | 6 | 12 |
| 7 | 19 | 7 | 14 |
| 8 | 21 | 8 | 16 |
| 9 | 22 | 9 | 18 |
| 10 | 24 | 10 | 20 |
| 11 | 26 | 11 | 22 |
| 12 | 27 | 12 | 24 |
| 13 | 29 | 13 | 26 |
| 14 | 31 | 14 | 28 |
| 15 | 32 | 15 | 30 |
| 16 | 34 | 16 | 32 |
| 17 | 36 | 17 | 34 |
| 18 | 38 | 18 | 36 |
| 19 | 40 | 19 | 38 |
| 20 | 41 | 20 | 40 |

DENSITY RAPIDLY VARIES
AS PATTERN VARIES

AFTER MODIFICATION

MODIFIED PATTERN TABLE

| DENSITY DETECTION PATTERN | INITIAL SENSOR OUTPUT VALUE | SENSOR OUTPUT VALUE AFTER VARIATION OF $\gamma$ | MODIFIED VALUE |
|---|---|---|---|
| A | A0 | A1 | (A1−A0) × 0.2 |
| B | B0 | B1 | (B1−B0) × 0.5 |
| C | C0 | C1 | (C1−C0) × 0.8 |

METHOD OF MODIFICATION 2

PATTERN OF 100TH LEVEL. AS COMPARED WITH 256-LEVEL PATTERN TABLE IN THRESHOLD, DOT HAVING NO. SMALLER THAN 247 IS TURNED ON.

IMAGE PROCESSING APPARATUS CAPABLE OF CREATING A DITHER MATRIX PROVIDING IMPROVED IMAGE QUALITY

This application is based on Japanese Patent Application No. 2003-125670 filed with Japan Patent Office on Apr. 30, 2003, the entire content of which is hereby incorporated by reference.

BACKGROUND OF THE INVENTION

1. Field of the Invention

The present invention relates generally to image processing apparatuses, image processing methods and image processing program products, and particularly to image processing apparatuses, methods and program products capable of creating a dither matrix providing improved image quality.

2. Description of the Related Art

Conventionally in the field of laser printers and other similar image forming apparatuses it has been known that in order to display a halftone image, dithering or the like is employed to control a number of dots corresponding to a level in intensity.

Creating a dither pattern used in dithering is accompanied by such a disadvantage as follows: initially for processing an image small in resolution such as 600×1200, 1 bit, increasing the number of lines is disadvantageously accompanied by insufficient levels. For example if a pattern of 150 lines per inch (LPI) is created, only 32 levels are obtained.

There is an approach allowing γ adjustment by remaking a dither pattern. This, however, requires creating a dither pattern having a capability of reproduction of approximately 1000 levels.

An approach accommodates such issues as above by tiling a dither matrix to obtain an apparent, large number of levels.

As a technique related thereto, Japanese Laid-Open Patent Publication No. 2001-111830 discloses a method of creating a dither pattern automatically from more than 256 basic patterns.

Furthermore, Japanese Laid-Open Patent Publication No. 2002-125122 discloses a technique forming a dither pattern by putting a subsequent dot at a location remotest from a previously put dot.

Furthermore, Japanese Laid-Open Patent Publication No. 2003-87567 discloses a technique growing identically shaped dots in a dither pattern at a plurality of locations in order.

In the conventional art, however, for example some orders of tiling a dither matrix disadvantageously provide a visually unwanted texture.

SUMMARY OF THE INVENTION

The present invention has been made to overcome the above disadvantage. It contemplates an image processing apparatus, method and program product capable of satisfactorily reproducing images.

To achieve the above object the present invention in an aspect provides an image processing apparatus using dithering to represent shades, including: a storage portion storing a basic dither pattern configured of a plurality of basic patterns; a dithering unit using the basic dither pattern to dither image data, the plurality of basic patterns each including a plurality of pixels; a first assignment portion assigning an initial value to a single pixel in one of the plurality of basic patterns as a number indicating an order to be followed to illuminate a dot in a dither matrix; and a second assignment portion selecting from the basic patterns longitudinally and laterally arranged a basic pattern remotest from any pixel assigned a number, and assigning a subsequent number to a pixel in the basic pattern selected, wherein the second assignment portion repeats assignment to assign in the basic dither pattern a number indicating an order to be followed to illuminate a dot.

The present invention in another aspect provides an image processing method employing dithering to represent shades, the method using a basic dither pattern configured of a plurality of basic patterns each including a plurality of pixels, the method including: an initial assignment step of assigning an initial value to a single pixel in one of the plurality of basic patterns as a number indicating an order to be followed to illuminate a dot in a dither matrix; a second assignment step of selecting from the basic patterns longitudinally and laterally arranged a basic pattern remotest from any pixel assigned a number, and assigning a subsequent number to a pixel in the basic pattern selected, repeatedly to assign in the basic dither pattern a number indicating an order to be followed to illuminate a dot; and a step of storing to a storage portion a basic dither pattern assigned a number indicating an order to be followed to illuminate a dot.

The present invention in still another aspect provides an image processing apparatus using dithering to represent shades, including: a storage portion storing a basic dither pattern configured of a plurality of basic patterns; and a dithering unit using the basic dither pattern to dither image data, wherein the plurality of basic patterns each including a plurality of pixels, the basic dither pattern has each pixel assigned a number indicating an order to be followed to illuminate a dot in a dither matrix, a single pixel in one of the plurality of basic patterns is assigned an initial value of the number, and subsequently when the basic patterns are arranged longitudinally and laterally a basic pattern remotest from any pixel assigned a number is selected in order and a pixel in that selected basic pattern is assigned a subsequent number.

The present invention devices a manner of assigning a number indicating an order followed to illuminate a dot in a basic dither pattern. The present invention can provide an image processing apparatus capable of satisfactorily reproducing images.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 4 and 5 show a specific example of a basic dither pattern.

FIGS. 7–9 show a specific example of a pattern table recorded in a pattern table storage portion 108.

FIG. 19 illustrates an effect in the present embodiment.

FIG. 26 shows all basic patterns each having present therein a single pixel assigned a number.

FIG. 27 shows that pixels are assigned numbers up to 100.

DESCRIPTION OF THE PREFERRED EMBODIMENTS

First Embodiment

Figure 1:
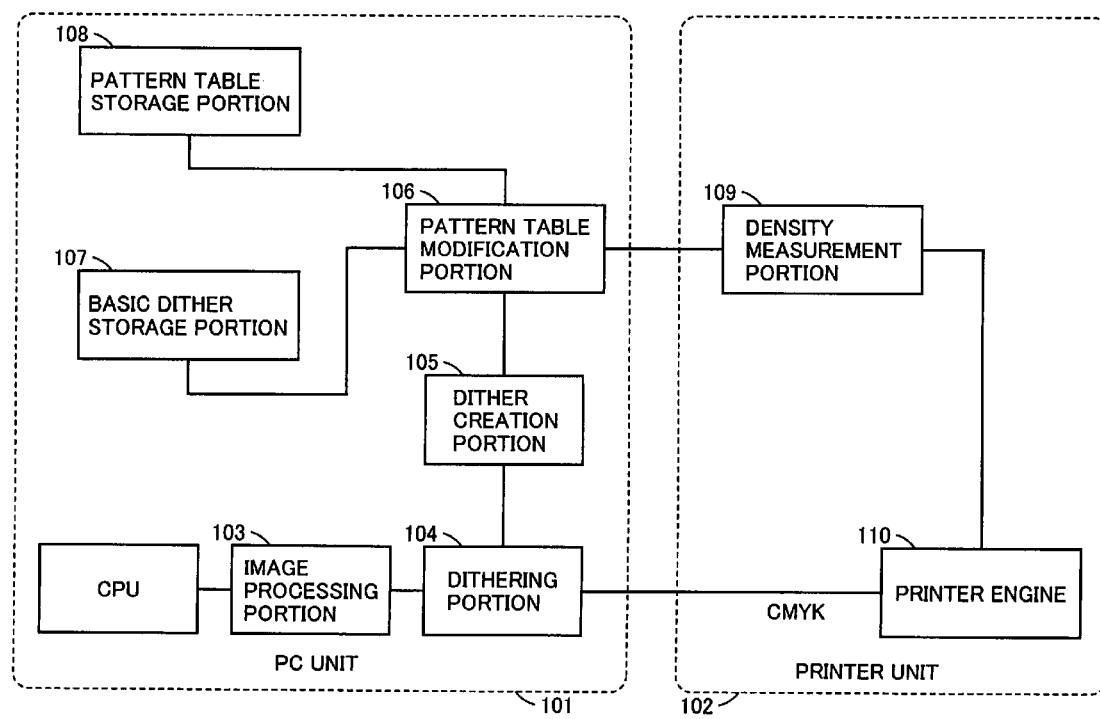
FIG. 1 schematically shows a configuration of an image processing apparatus in accordance with the present invention in a first embodiment.

With reference to FIG. 1, an image processing apparatus is configured of a personal computer (PC) unit 101 and a printer unit 102.

Personal computer 101 is a host computer outputting to printer unit 102 printing information (image information, printing commands and the like) for performing a printing process. Personal computer 101 includes an image processing portion 103 and a dithering portion 104 dithering image data transmitted from image processing portion 103. Herein, 256-level image data is processed for the sake of illustration. Furthermore, personal computer 101 includes a basic dither storage portion 107 storing a basic dither pattern having a size corresponding to 48 lateral pixels by 24 longitudinal pixels and capable of reproducing 1153 levels of gray, a pattern table storage portion 108 storing a pattern table correlating each of 256 levels of image data to a corresponding level (one of 1153 levels) of the basic dither pattern, a pattern table modification portion 106 for modifying the pattern table as a photoreceptor varies with time, and a dither creation portion 105 using the pattern table modified by portion 106 and the basic dither pattern to create a dither pattern corresponding to each of 256 levels in image data.

Dithering portion 104 uses a dither matrix created by dither creation portion 105 to subject image data to pseudo halftoning. A bit image thus generated is output to the printer unit 102 printer engine 110 and an image is actually formed. Printer unit 102 is herein a laser beam printer for the sake of illustration.

Printer unit 102 has a density measurement portion 109 with a sensor measuring a density of an image formed by printer engine 110. Pattern table modification portion 106 receives a signal from density measurement portion 109 to modify a pattern table held in pattern table storage portion 108. Furthermore, the basic dither pattern held in basic dither storage portion 107 and the rewritten pattern table are used to generate a dither matrix.

Figure 2:
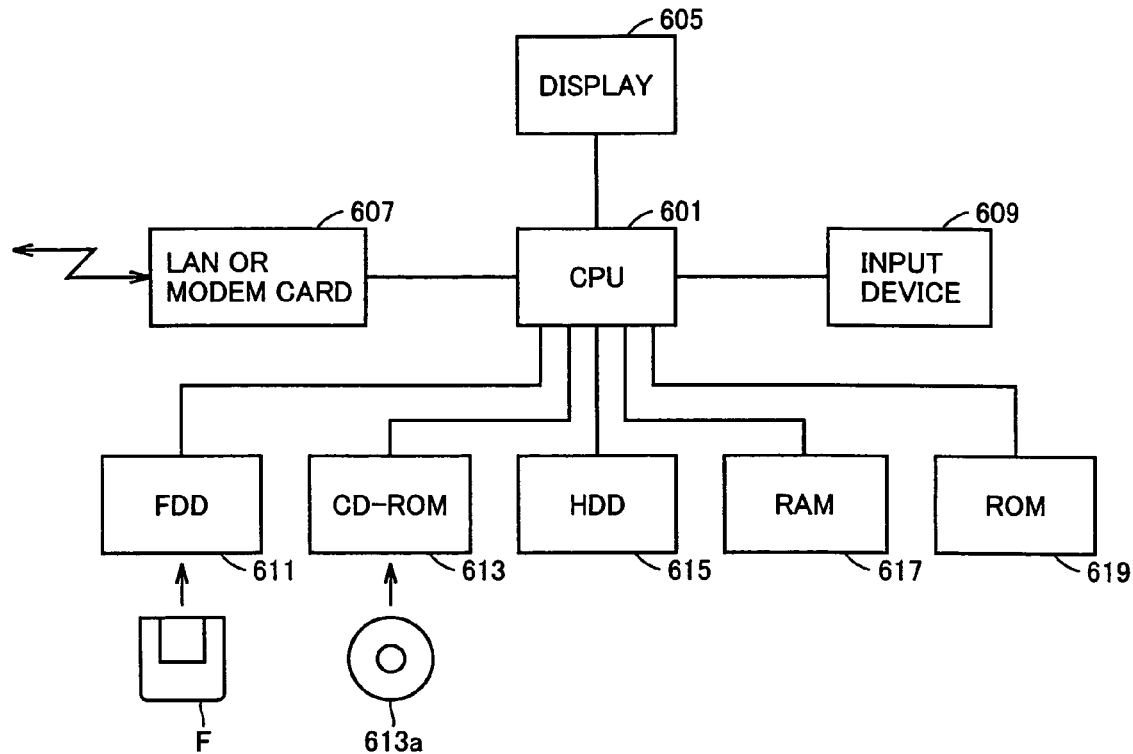
FIG. 2 is a block diagram showing a hardware configuration of a personal computer 101 shown in FIG. 1.

FIG. 2 is a block diagram showing a hardware configuration of personal computer 101 shown in FIG. 1.

With reference to the figure, personal computer 101 includes a CPU 601 generally controlling the apparatus, a display 605, a local area network (LAN) card 607 (or modem card) for connection to a network, external communication and the like, an input device 609 configured for example by a keyboard, a mouse and the like, a flexible disk drive 611, a CD-ROM drive 613, a hard disk drive 615, a RAM 617, and a ROM 619.

CPU (computer) 601 can be driven by a program recorded in a flexible disk F, CD-ROM 613a or other similar recording medium. This program is transmitted from the recording medium to RAM or other similar recording medium and stored therein. Note that the program may be recorded in a hard disk, ROM, RAM, a memory card or other similar recording medium and thus offered to users. Furthermore, via the Internet from an external site such a program may be downloaded to a work station, a printing apparatus and the like and executed.

Figure 3:
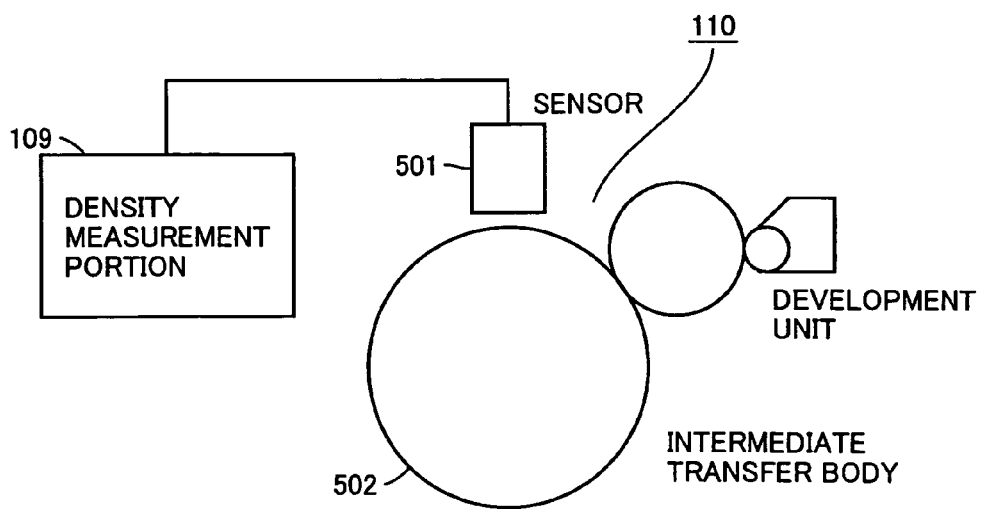
FIG. 3 schematically shows a configuration of a printer unit 102 shown in FIG. 1.

FIG. 3 schematically shows a configuration of printer unit 102 shown in FIG. 1.

With reference to the figure, printer unit 102 forms an image on an intermediate transfer body 502 by a development unit included in printer engine 110. In modifying a pattern table, a density detection pattern is formed on intermediate transfer body 502. By using sensor 501, density measurement portion 109 measures the density detection pattern's actual density.

Figure 4:
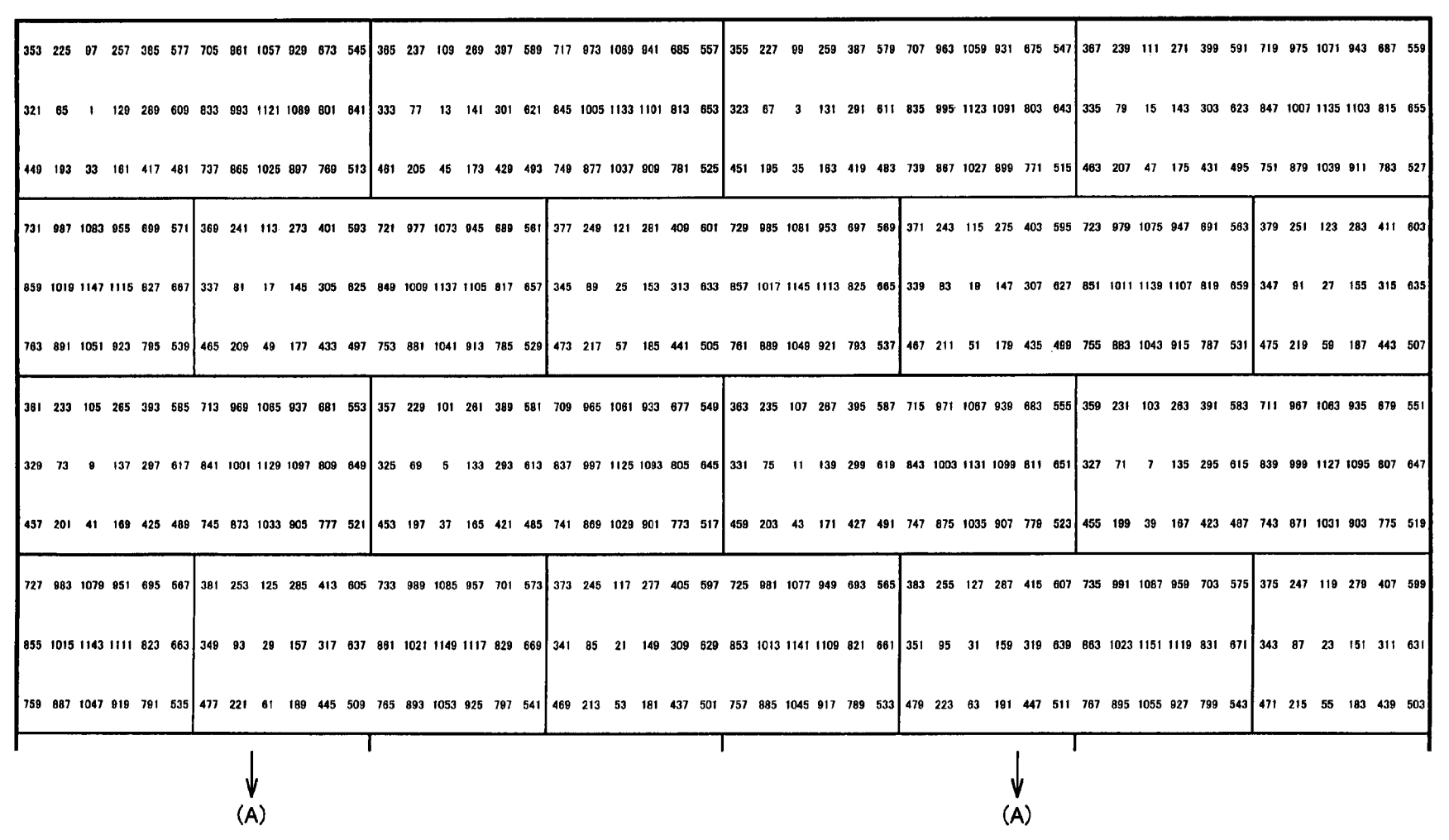
Figure 5:

FIGS. 4 and 5 show a specific example of a basic dither pattern. FIGS. 4 and 5 are connected at a portion (A).

The basic dither pattern is configured of a size corresponding to 48 lateral pixels and 24 longitudinal pixels. In the figure, for the sake of clarity, the basic dither pattern is divided by a solid line into blocks of a size corresponding to 12 lateral pixels by 3 longitudinal pixels. This block will be referred to as a "basic pattern." Note that vertically adjacent basic patterns are laterally offset. Thus for example basic patterns of the second column as seen from the top that are located rightmost and leftmost are of a size corresponding to 6 lateral pixels by 3 longitudinal pixels, and these two patterns are assumed to be connected laterally and, as well as other basic patterns, configure a single basic pattern of a size corresponding to 12 lateral pixels by 3 longitudinal pixels. Note that there exist four lateral by eight longitudinal basic patterns.

The basic dither pattern's 48 lateral by 24 longitudinal pixels assign values (numbers) of 1 to 1152, respectively. This value indicates an order in which a dot is illuminated in accordance with a level. If no dot illumination corresponds to a level of 0 and the basic dither pattern entirely illuminated corresponds to a level of 1152 then in total 1153 levels of gray can be represented.

Figure 6:
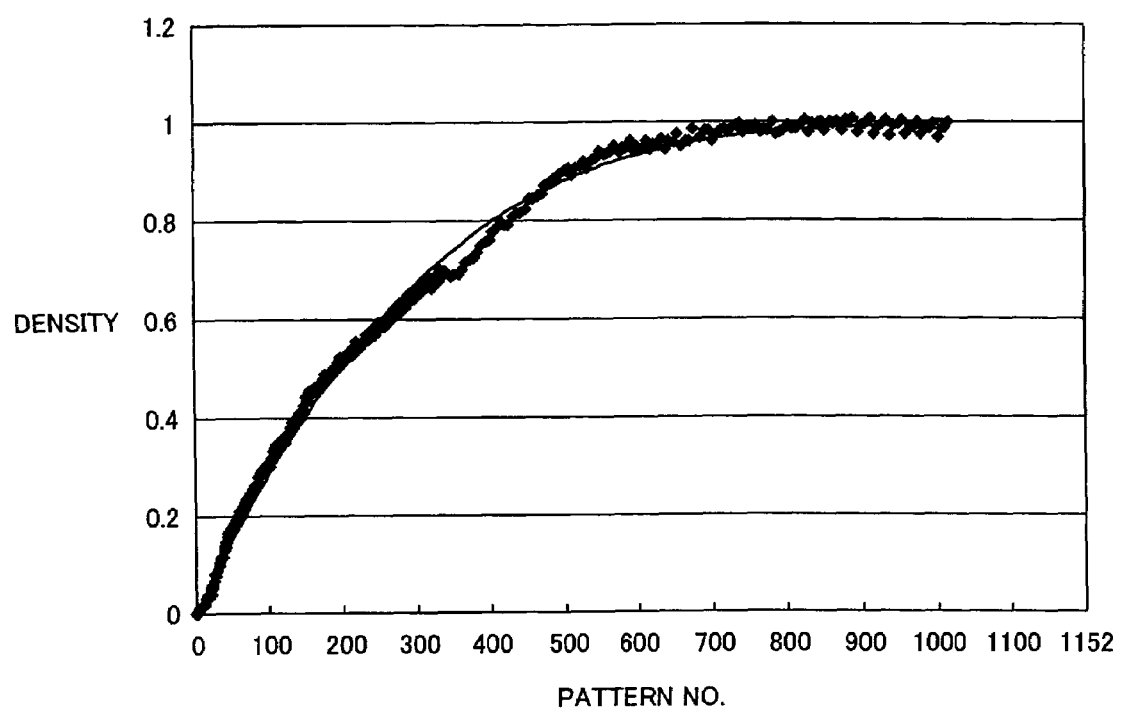
FIG. 6 represents a characteristic in density of the basic dither pattern shown in FIGS. 4 and 5.

FIG. 6 represents the FIGS. 4 and 5 basic dither pattern characteristic in density.

With reference to the figure, the vertical axis represents a value in density provided when a level of 1 to a level of 1153 are printed. The vertical axis is normalized with a density value for the level of 1153 as one. As shown in the figure, normally for low levels a rapidly rising density is provided, and when a value is exceeded, density is saturated and tends to less increase.

FIGS. 7–9 represent a specific example of a pattern table recorded in pattern table storage portion 108.

Herein, 256-level image data will be processed for the sake of illustration and a correspondence is provided as to which of the 1153 levels of the basic dither pattern each of the 256 levels corresponds to. More specifically, it is a table which determines up to which dot of the basic dither pattern to be illuminated for a level of gray of image data to be processed. For example, if input image data is data of a level of 10 then the basic dither pattern's threshold number is 40 so that a dither matrix is generated to illuminate the basic dither pattern's dots up to a number of 40.

Figures 10, 11:
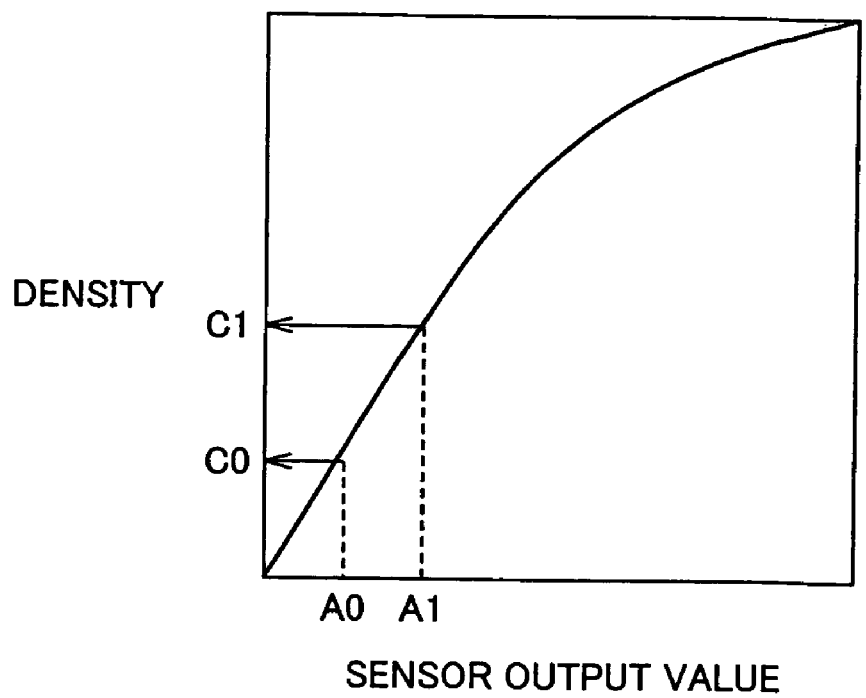
FIG. 10 represents a relationship between an output of a sensor 501 at a density of an image.
FIG. 11 illustrates a relationship between a density detection pattern and a level of a basic dither pattern corresponding thereto.

FIG. 10 represents a relationship between an output of sensor 501 and an image's density.

With reference to the figure, the sensor 501 output value (A0, A1) and density (C0, C1) correspond to each other in a one to one relationship. Accordingly from the sensor's output value a formed image's density can be obtained.

FIG. 11 represents a relationship between a density detection pattern created for density detection and a basic dither pattern's level corresponding thereto. As can be seen from the figure, the basic dither pattern of a density of a level of 80 is printed as a pattern A.

For a density detection pattern, any level is selected from the 1153 levels of the basic dither pattern. The FIG. 11 example sets a density detection pattern from the basic dither pattern, fine at a portion printed light and rough at a portion printed dark. It is of course not limited thereto and a pattern of density optimized in accordance with the system's characteristics can be set.

In this embodiment five different density patterns A–E are printed on intermediate transfer body 502 and the printed density detection patterns have their respective densities measured by sensor 501.

Figure 12:
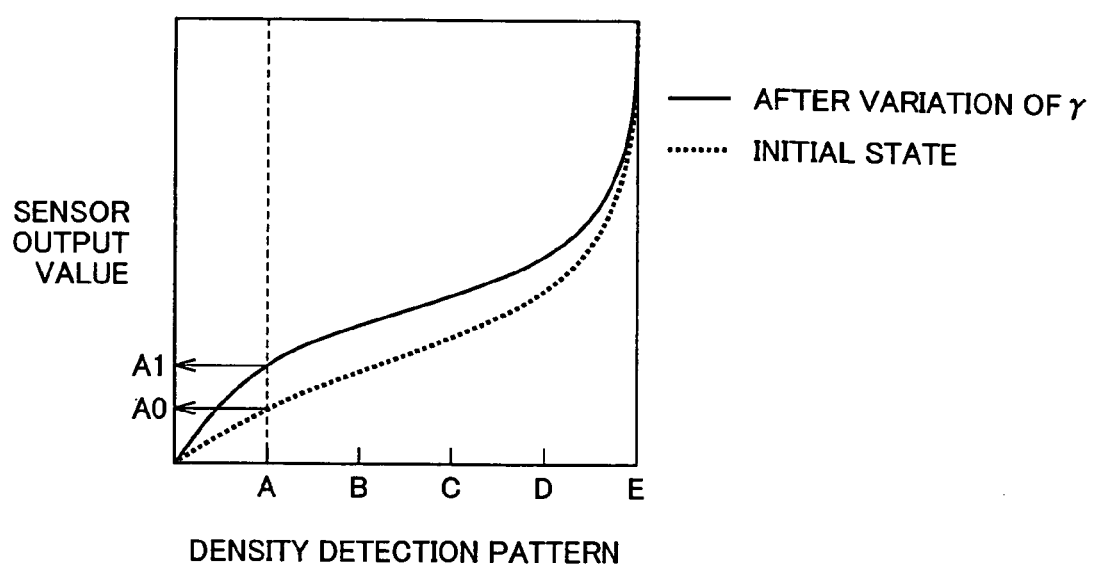
FIG. 12 represents a relationship between a density detection pattern and an output value obtained by sensor 501.

FIG. 12 represents a relationship between a density detection pattern and an output value obtained by sensor 501.

With reference to the figure, the dotted line represents an initial characteristic. When this varies for example as the environment changes or the number of prints changes with time, and the sensor 501 output changes, as indicated by the solid line, an output value that measures detection pattern A changes from A0 to A1.

When A0 and A1 are applied to the FIG. 10 sensor characteristic, it can be seen that density has actually changed from C0 to C1.

Figure 13:
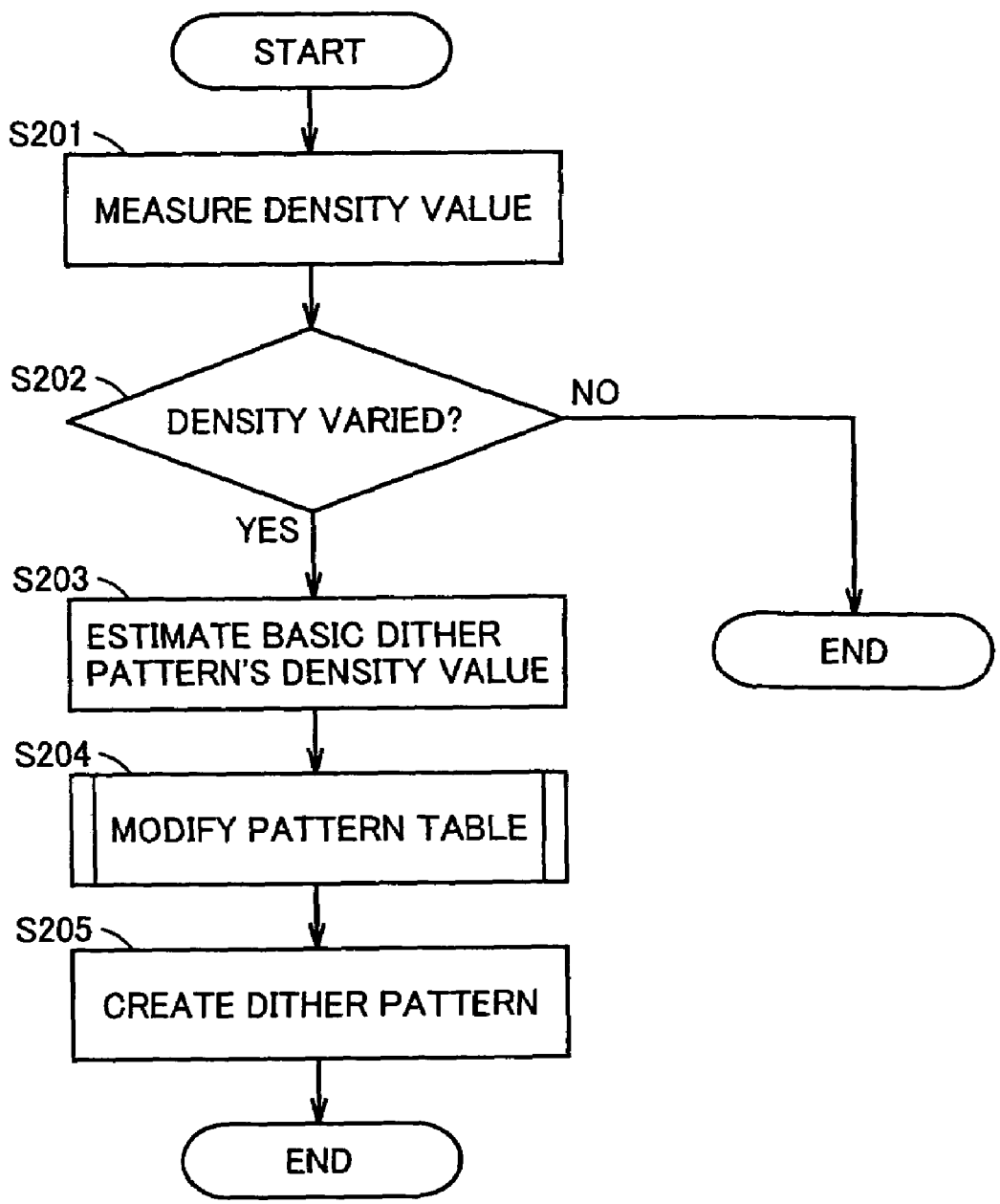
FIG. 13 is a flow chart representing a procedure of generating a dither matrix.

Reference will now be made to FIG. 13 to describe a procedure in the present embodiment to generate a dither matrix.

Initially at step S201 a density signal is received from density measurement portion 109 arranged in a printer. A decision is made at step S202 as to whether this density value has a variation as compared with a previously set density value.

If not then new creation of a dither matrix is stopped and a currently used dither matrix is continuously used.

If the density value has a variation then a subsequent step S203 et seq. are effected.

At step S203 a difference in density detected at S201 is used to estimate a value in density of a pattern actually printed in each basic dither pattern.

Then at step S204 the (FIGS. 7–9) pattern table's correspondence indicating which pattern of basic dither pattern each of 0–255 levels selects is rewritten as based on a value in density of a pattern actually printed in each basic dither pattern to set an appropriate output γ characteristic.

Finally at step S205 by a basic dither pattern and a pattern table a dither pattern required for performing dithering is created.

If density in printing has a variation for example with time, it can be followed up.

Figure 14:
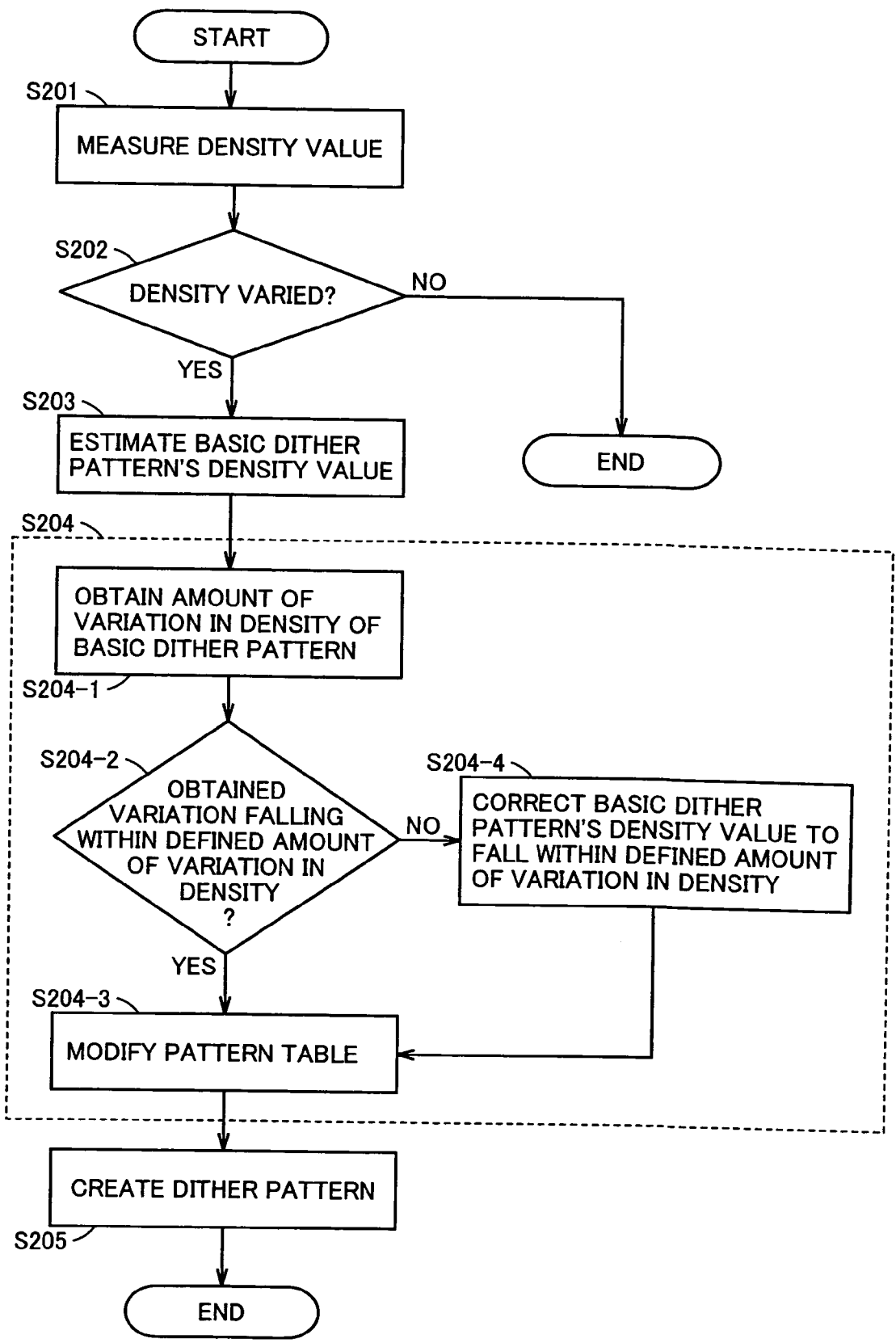
FIG. 14 is a flow chart specifically describing step S204 of FIG. 13.

FIG. 14 is a flow chart specifically illustrating step S204.

With reference to the figure, steps S201–S203 are performed and then at S204 the following process is performed.

At step S204-1, a variation in amount of a value in density of a pattern actually printed for each level of a basic dither pattern is obtained. At step S204-2, a decision is made as to whether the variation falls within a predetermined range and if so then at step S204-3 the variation is referred to to modify the pattern table.

If the variation does not fall within a predetermined range at step S204-2, then at step S204-4 the basic dither pattern's estimated value in density is corrected to allow the variation to fall within a defined amount of variation in density, and the control then proceeds with step S204-3.

Hereinafter will be described a specific example of a method of modifying the pattern table.

Figure 15:
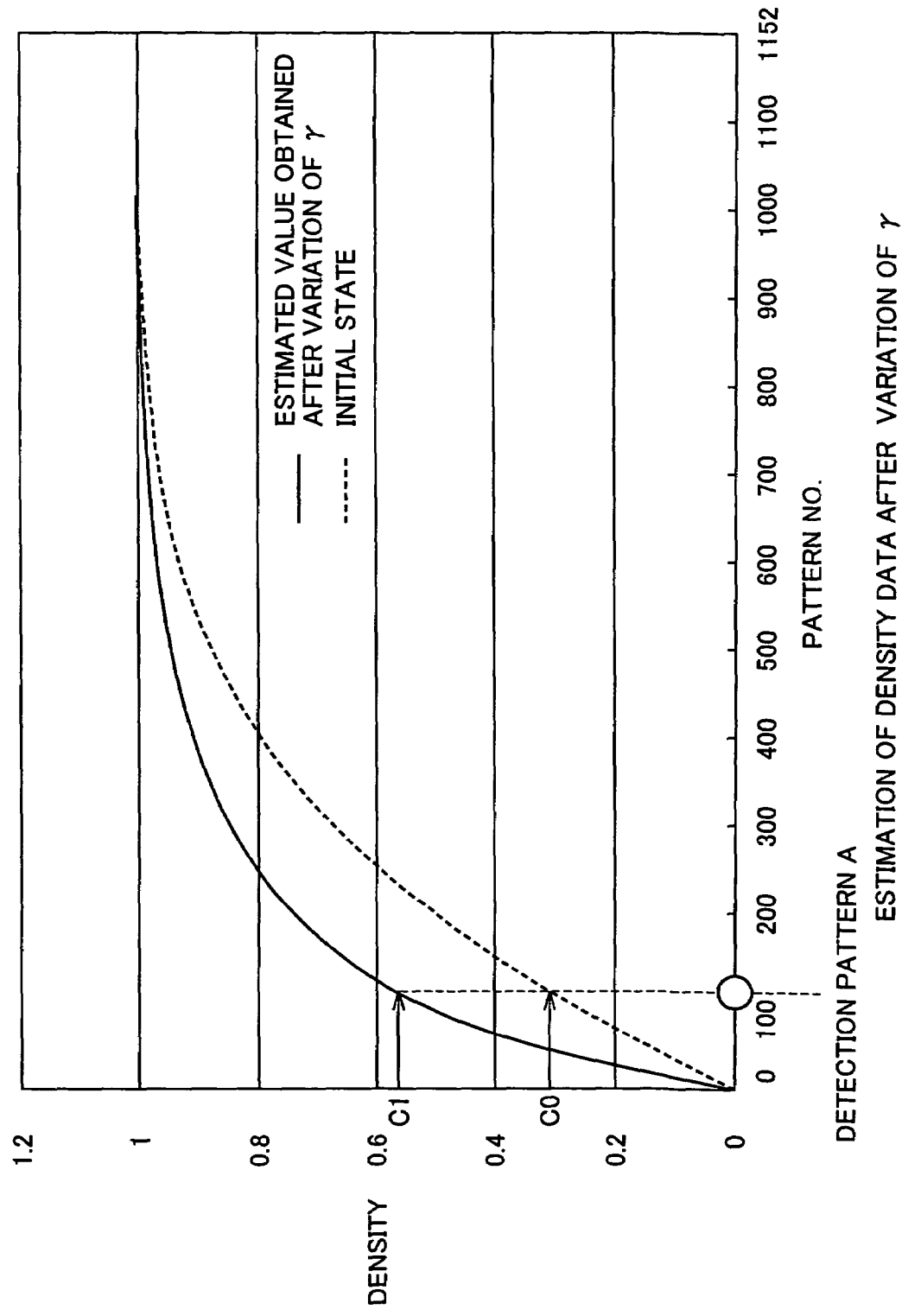
FIG. 15 represents a variation of a characteristic in density of a basic dither pattern.

FIG. 15 represents a variation of a characteristic in density of a basic dither pattern.

With reference to the figure, by measuring a formed density detection pattern with a sensor, from an initial characteristic, as indicated by a dotted line, to that obtained after a variation of γ, as indicated by a solid line, a relationship between a basic dither pattern and a density of an image formed thereby has varied, for the sake of illustration.

Herein, the density detection pattern A (see FIG. 11, a pattern of an 80th level in a basic dither pattern) density has changed from C0 to C1 for the sake of illustration. In that case, as indicated in the figure by the solid line, a characteristic obtained after a variation of γ is estimated.

If a basic dither pattern's characteristic in density has thus changed, failing to modify a dither matrix used in dithering portion 104 provides a rapidly increasing density for low levels of the basic dither pattern, resulting in a black, smeared image.

Accordingly, pattern table modification portion 106 modifies the pattern table.

Figure 16:
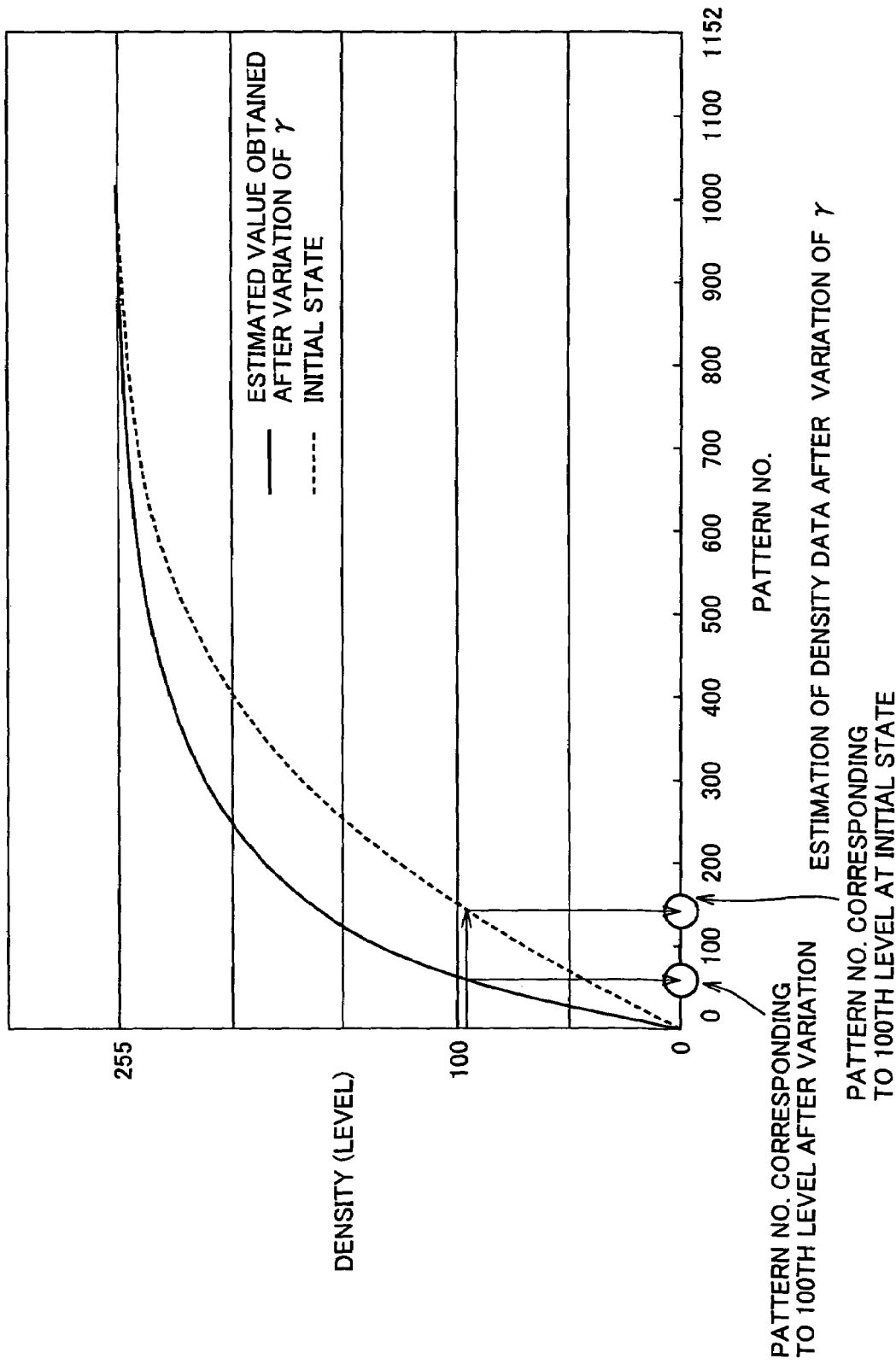
FIG. 16 represents a technique allowing a pattern table modification portion 106 to modify a pattern table.

FIG. 16 represents a technique enabling pattern table modification portion 106 to modify the pattern table.

Herein the vertical axis does not represent density. Rather, it represents 0–255 image data levels. As setting density values of 0 to 1 to correspond to image data's intensity (levels) of 0 to 255 linearly is desirable as an output characteristic, the vertical axis can thus be set.

It can be seen that for the initial γ characteristic the intensity of the 100th level correspond to 100 of a basic dither pattern and that obtained after a variation of γ it has varied to 40.

From this, pattern table modification portion 106 conducts a search with respect to image data of 0–255 as to which level of the basic dither pattern to be used and modifies the pattern table. By this modified pattern table and the basic dither pattern, a new dither matrix used at dithering portion 104 is created.

Such a process allows printing constantly with a standard γ characteristic regardless of the printer engine's variations in characteristic. With this process, however, some variations of the engine in characteristic can provide gradation with banding (or color skipping) disadvantageously.

Figure 17:
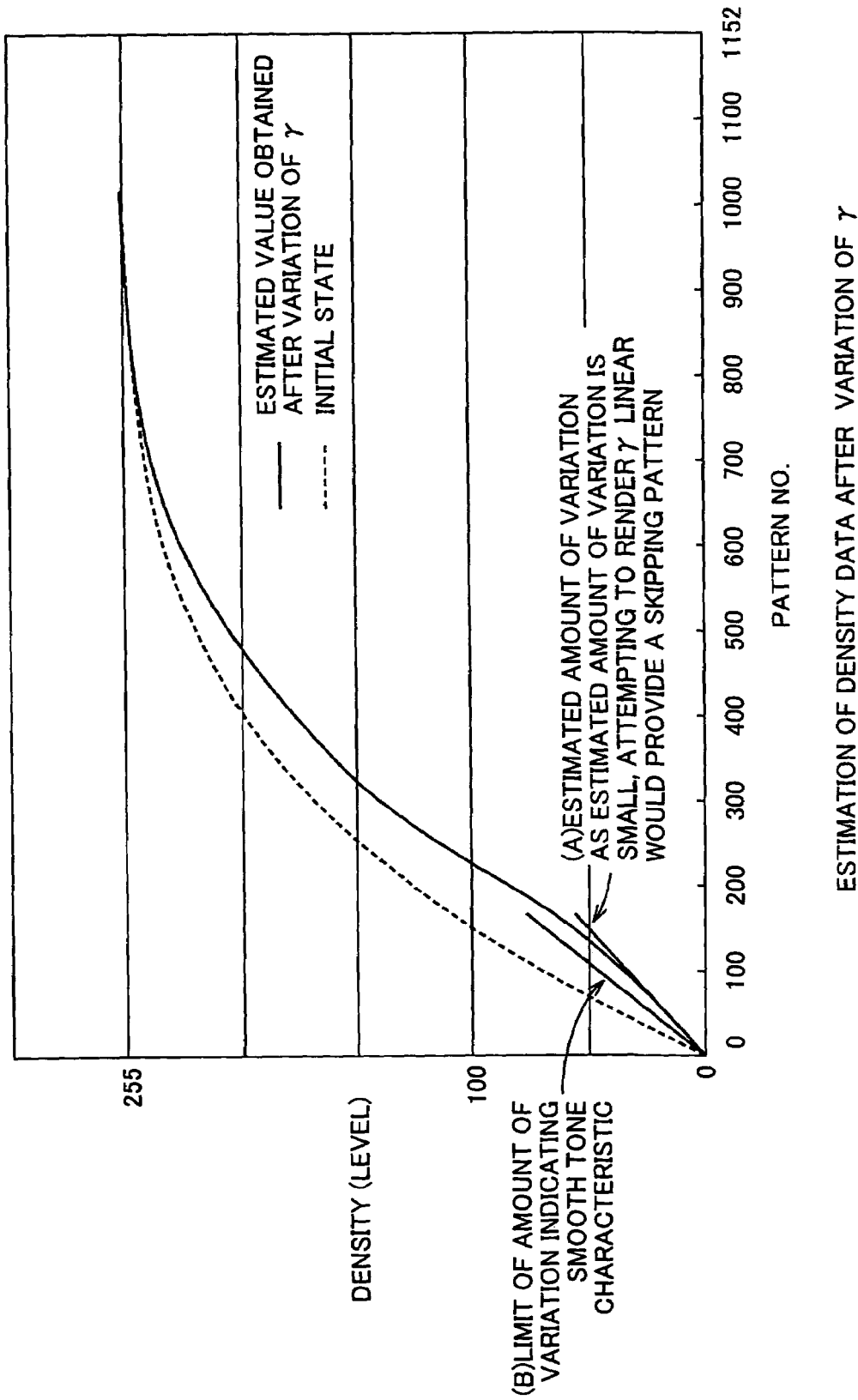
FIG. 17 represents a disadvantage introduced when a pattern table is simply corrected.

FIG. 17 is a diagram for illustrating a disadvantage introduced when the pattern table is simply modified.

With reference to the figure, it can be seen that when an initial γ characteristic (a dotted line) has varied, as indicated by a solid line, a small density variation rate is observed at a light portion (in a vicinity of the 0th level to the 100th level of a basic dither pattern) (indicated in the figure by (A)). In such a state, failing to change the number of levels of the basic dither pattern to some extent rapidly would provide a substantially unchanged density output.

In that case, attempting to introduce adjustment to match the initial γ characteristic will results in a significantly skipped pattern being selected from basic dither pattern in modifying the pattern table. In such a case, if a variation in density is small, at a portion with gradation a pattern will significantly change, visually resulting in banding.

It is effective for banding to select patterns adjacent in density that are moderately close in basic dither pattern even if actually there is a more or less offset from the initial (standard) γ. In FIG. 17, a limit of smooth level variation curve free of banding at (B) is shown.

In the present embodiment, banding is prevented by correcting an estimated curve obtained after a variation of γ.

Figure 18:
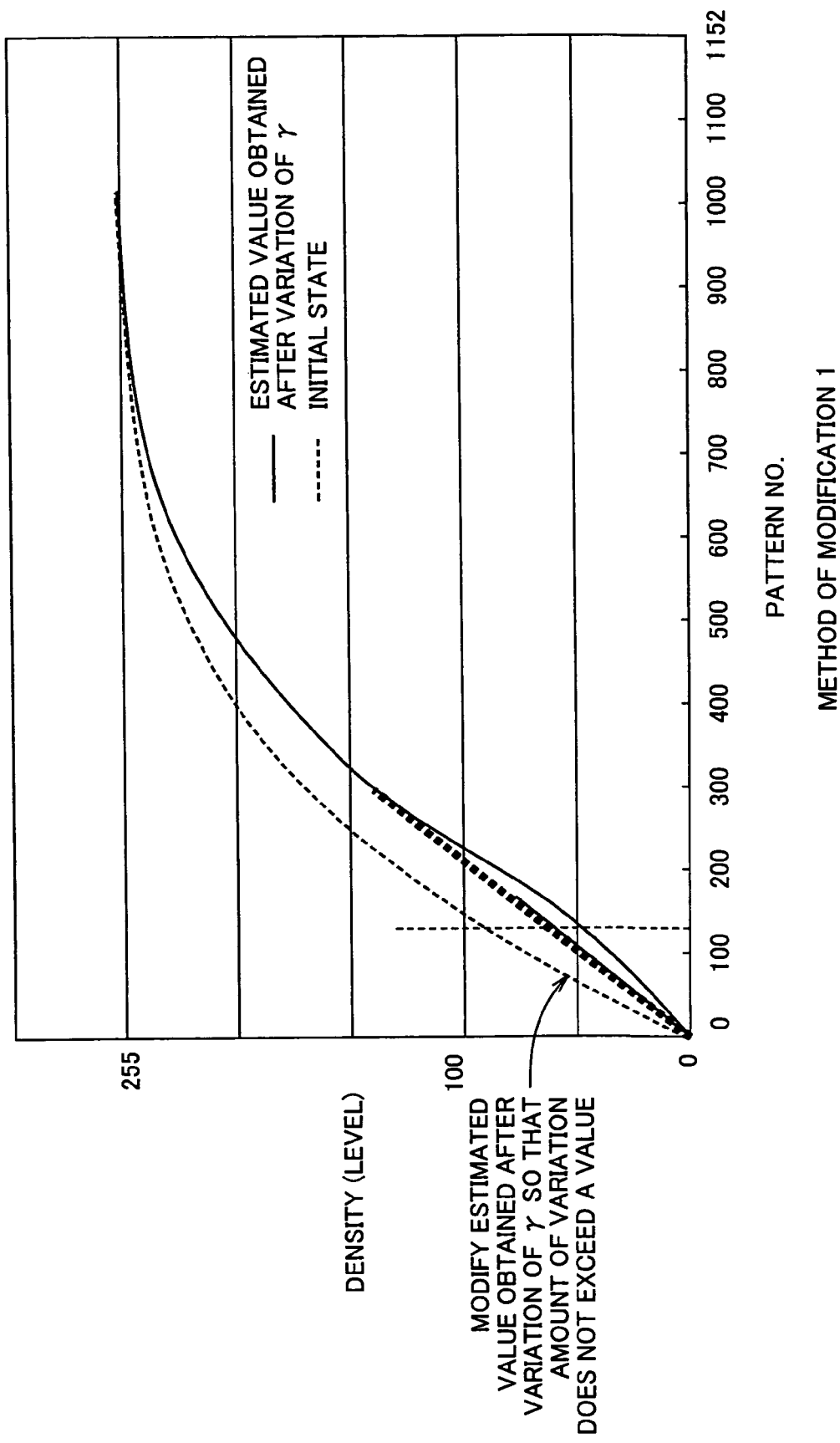
FIG. 18 illustrates a method of correcting an estimated curve obtained after variation of γ in the present embodiment.

FIG. 18 is a diagram for illustrating a method performed in the present embodiment to modify an estimated characteristic obtained after a variation of γ.

In the present embodiment, as indicated in FIG. 18 by a dotted line, a basic dither pattern's estimated density value is changed (a portion corresponding to a density value obtained after a variation of γ, as indicated by a solid line, that is estimated to be low and associated with too large a variation of dither pattern relative to variation in density, is reduced approximately to the limit indicated in FIG. 17 by (B). Thus, although there is a small offset from the standard γ, an output image does not have banding and a significantly satisfactory image can thus be obtained.

FIG. 19 is a diagram for illustrating an effect in the present embodiment. In the figure, only a portion of a pattern table for low levels (density) is indicated.

In the pattern table presented in the figure on the left hand for example when a level of 2 shifts to that of 3 the basic dither pattern's level would jump from 5 to 13 and a pattern formed at this portion would significantly change, resulting in banding. In the present embodiment, the pattern table can be modified, as shown in the figure on the right hand, to prevent a pattern from significantly changing as a level changes.

Thus in the present embodiment in electronic photography using dithering to represent levels a dither pattern's variation in density can be controlled to be less than a determined value corresponding to density. A satisfactory image can thus be created.

Note that while in the present embodiment a 256-level pattern is correlated from a basic dither pattern capable of representing 1153 levels, the present invention is applicable to any technique selecting an N-level pattern from a number M or levels that a basic dither pattern can represent, wherein N<M.

More specifically in the present invention in image binarization technology an unnecessary pattern (e.g., a light pattern that is not printed, a pattern that is not used as it is substantially the same in density, and the like) is also previously held and, as required, a desired pattern is selected. A high quality image can be provided, and regardless of the engine's variation in characteristic, an optimal γ characteristic can constantly be provided (i.e., regardless of variation of γ, printing can be achieved constantly with a pattern of a number of levels as required) and thereby a smooth gradation can be obtained effectively.

Second Embodiment

Figure 20:
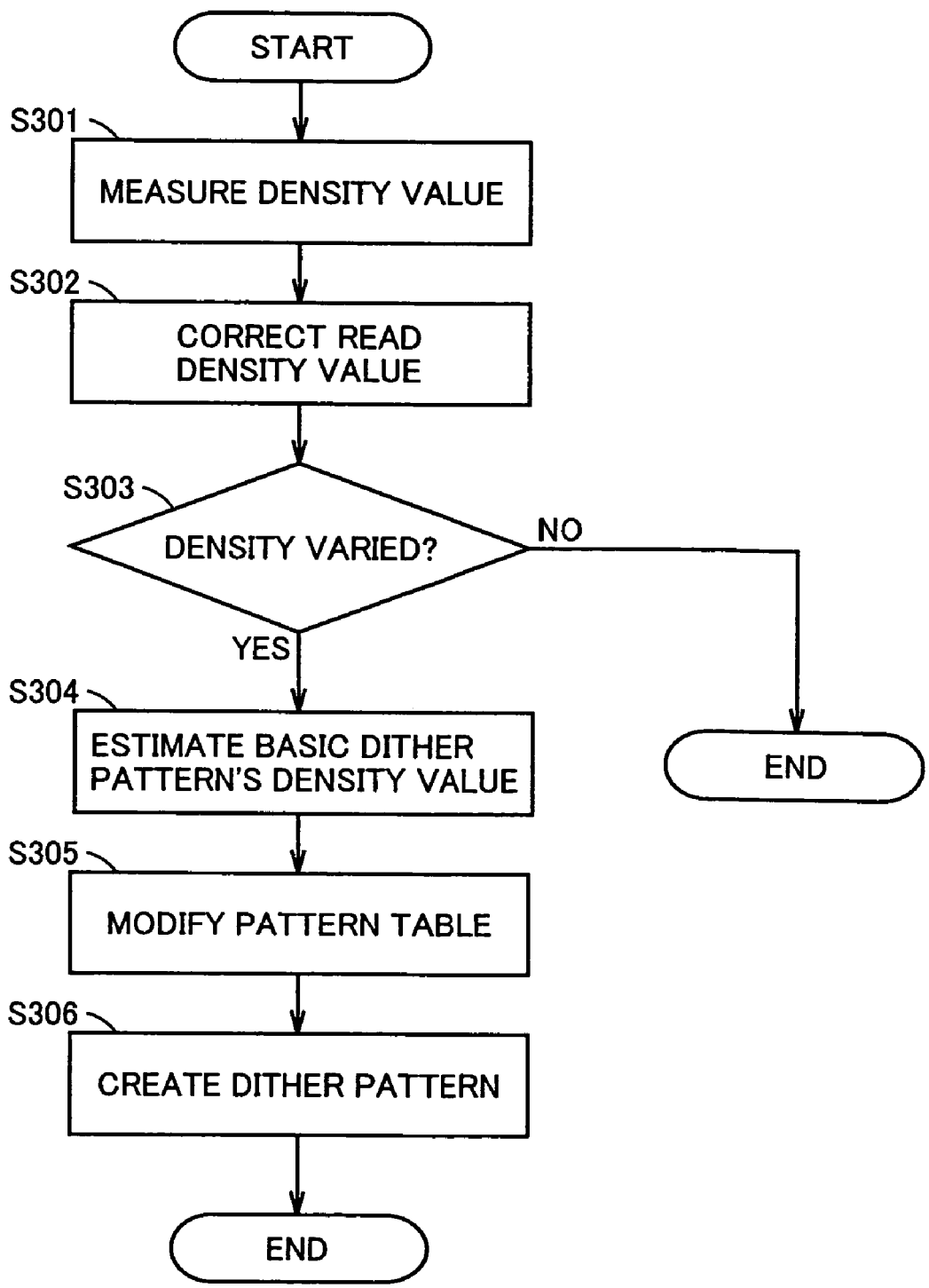
FIG. 20 is a flow chart representing a process performed by the present image processing apparatus in a second embodiment to create a dither pattern.

FIG. 20 is a flow chart of a process performed by the present image processing apparatus in a second embodiment to create a dither pattern.

The image processing apparatus in the present embodiment has the same hardware configuration and the like as that in the first embodiment.

With reference to FIG. 20 at step S301 a density detection pattern is formed and density measurement portion 109 measures a value in density of the density detection pattern. At step S302 the detected value in density is corrected as based on the formed density detection pattern's level.

At step S303 a decision is made as to whether density has varied. If not the process ends. If density has varied then at step S304 a value in density of each level of a basic dither pattern is estimated. At step S305, the estimated density value is referred to to modify a pattern table and at step S306 the modified pattern table and the basic dither pattern are used to create a new dither pattern.

Figures 21, 22:
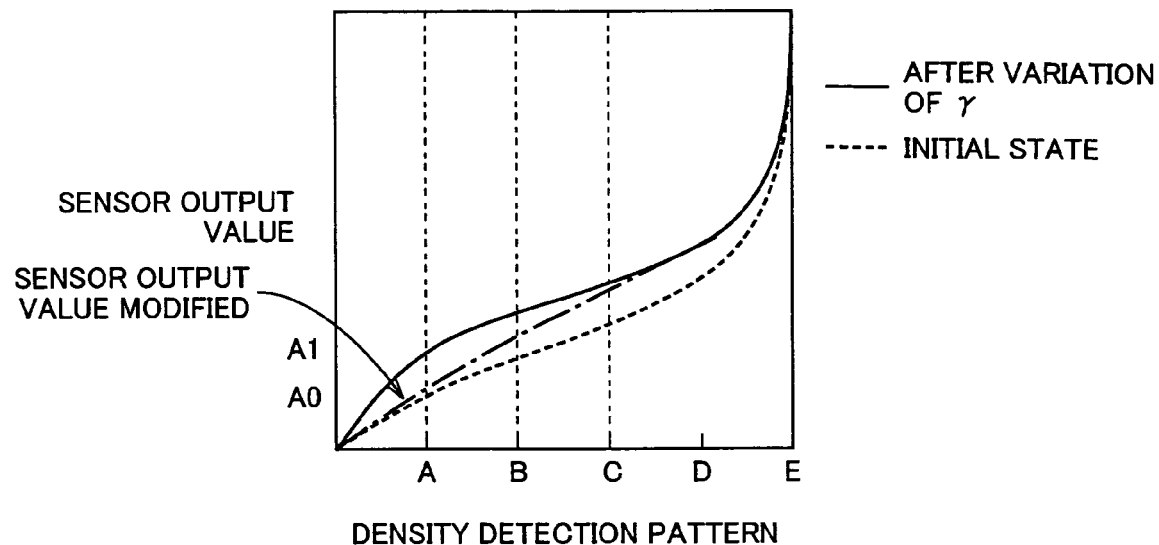
FIG. 21 is a graph representing a relationship between a density detection pattern and a sensor output value.
FIG. 22 illustrates a relationship between a density detection pattern and a method of modifying a sensor output value.

FIG. 21 is a graph representing a relationship between a density detection pattern and a sensor output value.

A factor that introduces banding is the reliability of a value output from the sensor. For light patterns, in particular, the sensor can output a value significantly different from the actual value. This is attributed to either the sensor's sensitivity or that there is a case where light patterns are unsuccessfully printed.

Accordingly, as shown in FIG. 21, while a sensor output value varies from the dotted line to the solid line, for low density the value is considered to be less reliable and is accordingly modified to be close to the initial value (e.g., density detection pattern A). For higher density, the value is considered to be more reliable and is exactly used as it is.

FIG. 22 represents a relationship between a density detection pattern and a method of modifying a sensor output value.

With reference to the figure, density increases as the density detection pattern proceeds from A to C, for the sake of illustration. If density detection patterns A, B and C' respective sensor output values for an initial state are represented by A0, B0, and C0, respectively, and those after γ has varied are represented by A1, B1, and C1, respectively, then their respective values after modification are calculated as follows.

density detection pattern A: (A1−A0)×0.2
density detection pattern B: (B1−B0)×0.5
density detection pattern C: (C1−C0)×0.8

Thus in accordance with a density detection pattern's density the sensor value's reliability can be changed and accordingly the sensor's output value can be corrected to prevent rapid variation of γ. As well as in the first embodiment, banding and the like can be prevented.

A method of creating a basic dither pattern will now be described.

A basic dither pattern described in the first and second embodiments is created, as described hereinafter, and stored to basic dither storage portion 107 to improve image quality.

Figure 23:
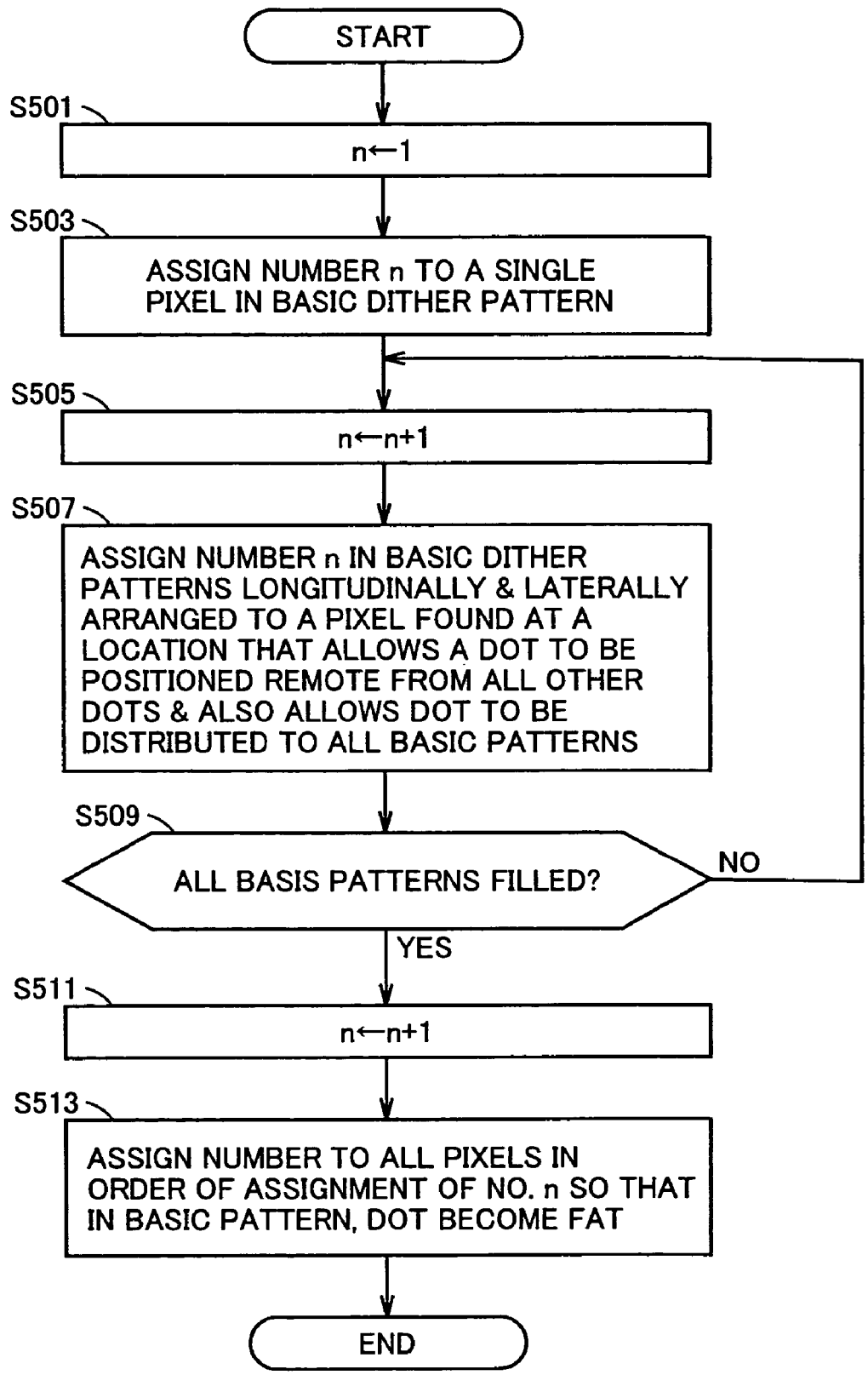
FIG. 23 is a flow chart of a procedure of creating a basic dither pattern.

FIG. 23 is a flow chart of a procedure followed to create a basic dither pattern. This process may be performed by causing a computer to execute a computer program recorded in a recording medium.

With reference to the figure at step S501 "1" is assigned to a variable n. At step S503 a single pixel in a basic dither pattern (in FIGS. 4 and 5, any of 48×24 pixels) is assigned a number n. At step S505, the n's value is incremented by one.

At step S507, when basic dither patterns are arranged longitudinally and laterally, a pixel at a location that allows a dot to be positioned remote from all other dots and also allows dot to be distributed to all basic patterns is assigned number n. Note that as has been described previously, a basic pattern means a small block corresponding to a subsection of a basic dither pattern that is formed for example of 12×3 pixels. At step S509 a decision is made as to whether all basic patterns are assigned any number (i.e., whether there does not exist a basic pattern with its pixels all free of any number). If so the control proceeds with step S511. Otherwise the control proceeds with step S505.

Figure 25:
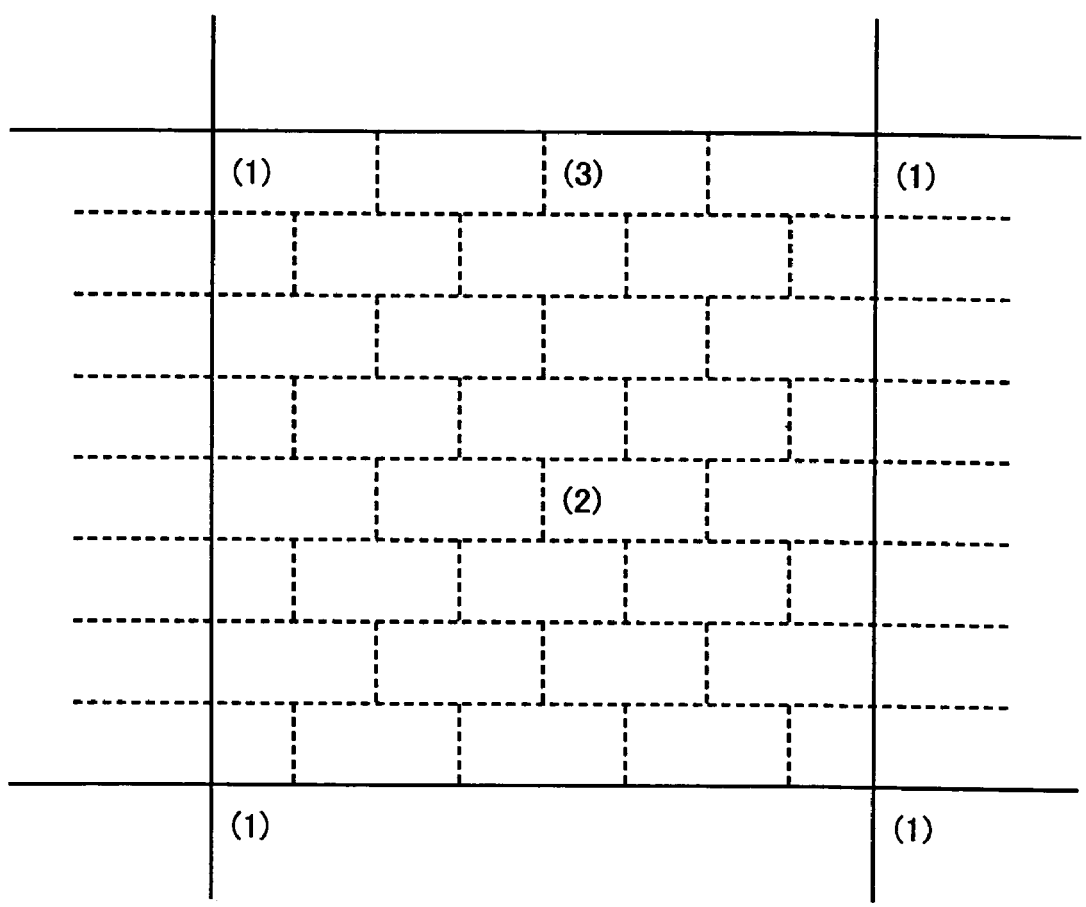
FIG. 25 is a view for illustrating steps S503–509 of FIG. 23.

FIG. 25 is a diagram for illustrating steps S503–509.

With reference to the figure, the solid lines define a basic dither pattern, and such basic dither patterns are arranged longitudinally and laterally. Dotted line defines basic patterns.

With reference to the figure, at step S503 a location (1) is assigned a number 1 for the sake of illustration. As basic dither patterns exist such that they are arranged longitudinally and laterally, all basic dither patterns have their respective locations (1)s assigned the number 1. At step S505, n is incremented by one, thus attaining "2".

At step S507 with basic dither patterns longitudinally and laterally arranged a pixel at a location that allows a dot to be positioned remote from all other dots and also allows dot to be distributed to all basic patterns is assigned number n. To do so, as shown in FIG. 25, a location (2) remotest from all of four locations (1)s is assigned a number 2. At step S505, n is further incremented by one, thus attaining "3".

Subsequently at step S505 a pixel at a location remotest from locations (1) and (2), e.g., a location (3) is assigned a number 3.

Figure 26:
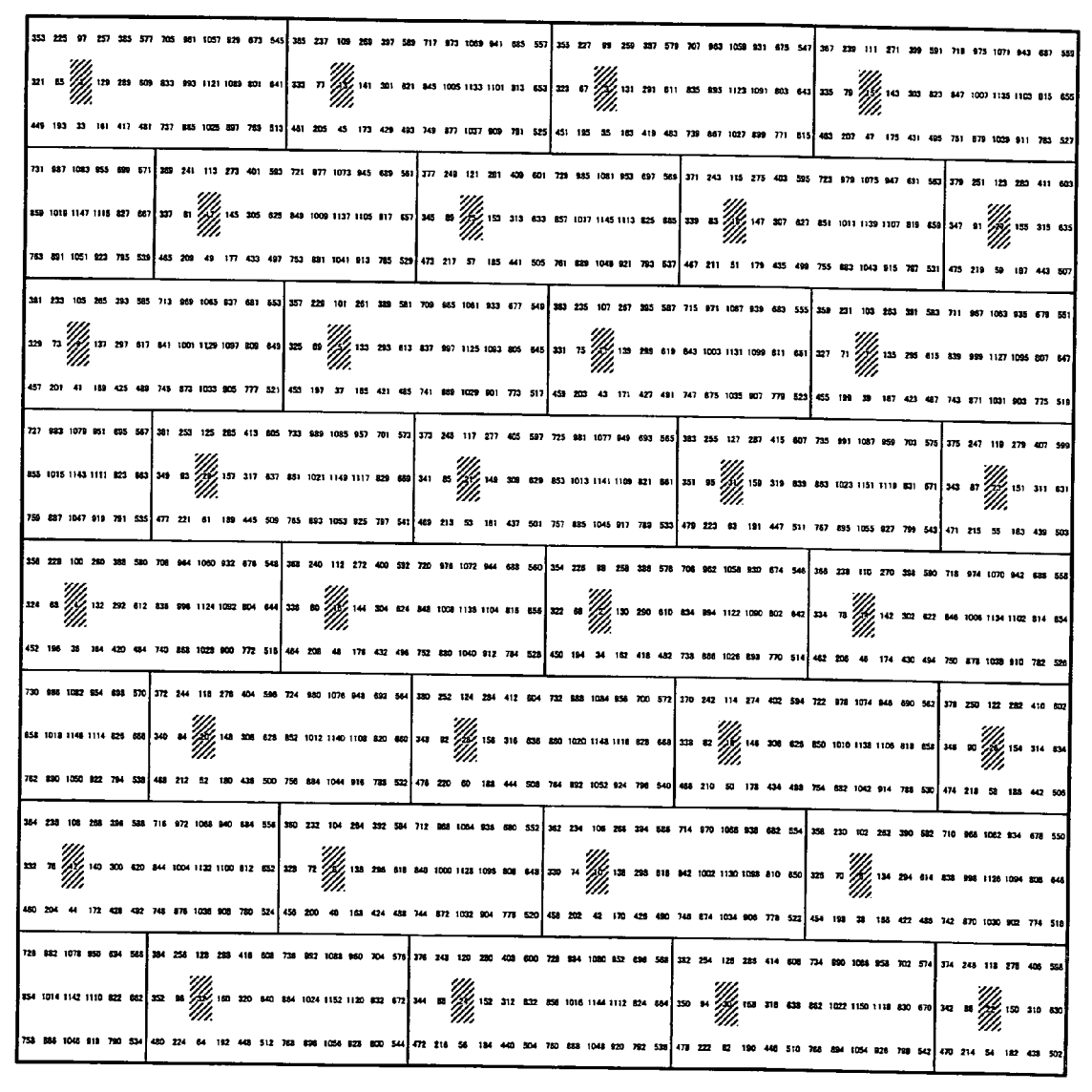

Steps S505–509 are repeated until there no longer exists a basic pattern formed only of pixels that are not assigned any number. Thus all basic patterns have single pixels, respectively, each assigned a number. This is shown in FIG. 26. In the figure, a hatched pixel is a pixel assigned a number.

Then, at step S513, in the order in which number n is assigned a basic pattern has therein a dot made fat (a dither matrix of dot convergence type is provided). Thus all pixels are assign a number. Thus the dither matrix becomes an amplitude modulation (AM) screen.

FIG. 27 shows that pixels are assigned numbers up to 247. Pixels assigned numbers are shown hatched.

Thus in a basic dither pattern dots are dispersedly distributed, while in basic patterns dots can also be made fat. A basic dither pattern capable of forming a satisfactory image can thus be created.

Figure 24:
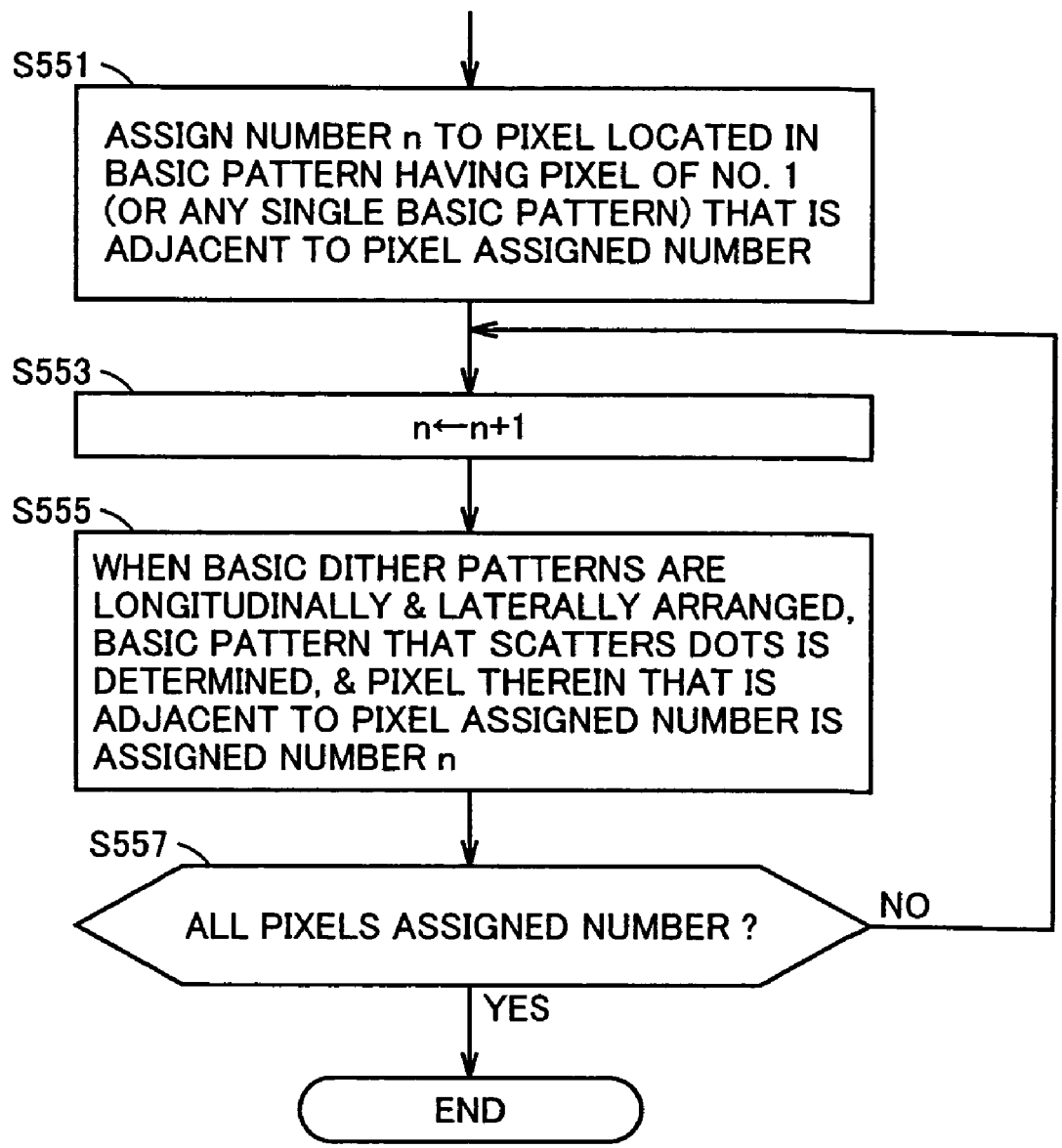
FIG. 24 is a flow chart of an exemplary variation of step S513 of FIG. 23.

Note that the FIG. 23 step S513 may be replaced with the FIG. 24 process.

With reference to FIG. 24 at step S551 a pixel located in a basic pattern having a pixel assigned the number 1 (or any single basic pattern) that is adjacent to numbered pixel is assigned number n.

At step S553 the n's value is incremented by one. At step S555 when basic dither patterns are arranged longitudinally and laterally a basic pattern that scatters dots is determined and a pixel in that basic pattern that is adjacent to a pixel assigned a number is assigned number n.

At step S557 the control examines whether all pixels are each assigned a number. If not steps S553 et seq. are repeated until all pixels are assigned numbers.

Note that while in FIG. 23 at step S507 a pixel's position is directly determined and assignment is effected, a basic pattern remotest from that having a pixel assigned a number may have a pixel assigned a number.

Note that a program executing the process in the flow chart in the above embodiments may be provided, and the program may be recorded in a CD-ROM, a flexible disk, a hard disk, ROM, RAM, a memory card or any other similar recording medium and offered to users. Furthermore, the program may be adapted to be downloaded through the Internet or any other similar communication line to the apparatus.

Furthermore the process described in the above embodiments may be effected by software or by using a hardware circuit.

Furthermore the apparatus and the like described in the above embodiments are applicable in both an environment connected to a network or that unconnected thereto.

Thus in accordance with the present invention an image processing apparatus, method and program that can satisfactorily reproduce images can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus using dithering to represent shades, comprising:
   a storage portion storing a basic dither pattern configured of a plurality of basic patterns;
   a dithering unit using said basic dither pattern to dither image data, said plurality of basic patterns each including a plurality of pixels;
   a first assignment portion assigning an initial value to a single pixel in one of said plurality of basic patterns as a number indicating an order to be followed to illuminate a dot in a dither matrix; and
   a second assignment portion selecting from said basic patterns longitudinally and laterally arranged a basic pattern remotest from any pixel assigned a number, and assigning a subsequent number to a pixel in said basic pattern selected, wherein said second assignment portion repeats assignment to assign in said basic dither pattern a number indicating an order to be followed to illuminate a dot.

2. The apparatus of claim 1, wherein in said basic pattern a number indicating an order to be followed to illuminate a dot is assigned to allow the dither matrix to be a dither matrix of dot convergence type.

3. The apparatus of claim 1, further comprising:
   a third assignment portion assigning, when said basic dither pattern has all of its basic patterns each with a single pixel assigned a number, a subsequent number to a pixel adjacent to a pixel assigned a number by said first assignment portion; and
   a fourth assignment portion selecting from said basic patterns longitudinally and laterally arranged a basic pattern remotest from any basic pattern including a pixel assigned a number after said second assignment portion has performed said assignment, and assigning a subsequent number to a pixel adjacent to a pixel in that basic pattern that is assigned a number, wherein said fourth assignment portion repeats assignment to assign in said basic dither pattern a number indicating an order to be followed to illuminate a dot.

4. The apparatus of claim 1, further comprising a table storage portion storing a table correlating a shade of said image data to a shade in a basic dither pattern, wherein said dithering unit uses said basic dither pattern and said table to dither image data.

5. The apparatus of claim 4, further comprising an image forming unit forming an image based on image data dithered by said dithering unit.

6. The apparatus of claim 5, further comprising:
a detector detecting a density of a pattern formed by said image forming unit; and
a table modification portion driven by the density detected by said detector to modify said table.

7. An image processing method employing dithering to represent shades, the method using a basic dither pattern configured of a plurality of basic patterns each including a plurality of pixels, the method comprising:
an initial assignment step of assigning an initial value to a single pixel in one of said plurality of basic patterns as a number indicating an order to be followed to illuminate a dot in a dither matrix;
a second assignment step of selecting from said basic patterns longitudinally and laterally arranged a basic pattern remotest from any pixel assigned a number, and assigning a subsequent number to a pixel in said basic pattern selected, repeatedly to assign in said basic dither pattern a number indicating an order to be followed to illuminate a dot; and
a step of storing to a storage portion a basic dither pattern assigned a number indicating an order to be followed to illuminate a dot.

8. The method of claim 7, wherein in said basic pattern a number indicating an order to be followed to illuminate a dot is assigned to allow the dither matrix to be a dither matrix of dot convergence type.

9. The method of claim 7, further comprising:
a third assignment step assigning, when said basic dither pattern has all of its basic patterns each with a single pixel assigned a number, a subsequent number to a pixel adjacent to a pixel assigned a number at the first assignment step; and
a fourth assignment portion selecting from said basic patterns longitudinally and laterally arranged a basic pattern remotest from any basic pattern including a pixel assigned a number after the second assignment step has been performed, and assigning a subsequent number to a pixel adjacent to a pixel in that basic pattern that is assigned a number, repeatedly to assign in said basic dither pattern a number indicating an order to be followed to illuminate a dot.

10. An image processing program product causing a computer to perform an image process representing shades using dithering employing a basic dither pattern configured of a plurality of basic patterns each including a plurality of pixels, the product causing the computer to execute:
an initial assignment step of assigning an initial value to a single pixel in one of said plurality of basic patterns as a number indicating an order to be followed to illuminate a dot in a dither matrix;
a second assignment step of selecting from said basic patterns longitudinally and laterally arranged a basic pattern remotest from any pixel assigned a number, and assigning a subsequent number to a pixel in said basic pattern selected, repeatedly to assign in said basic dither pattern a number indicating an order to be followed to illuminate a dot; and
a step of storing to a storage portion a basic dither pattern assigned a number indicating an order to be followed to illuminate a dot.

11. The product of claim 10, wherein in said basic pattern a number indicating an order to be followed to illuminate a dot is assigned to allow the dither matrix to be a dither matrix of dot convergence type.

12. The product of claim 10, causing the computer to further execute:
a third assignment step assigning, when said basic dither pattern has all of its basic patterns each with a single pixel assigned a number, a subsequent number to a pixel adjacent to a pixel assigned a number at the first assignment step; and
a fourth assignment portion selecting from said basic patterns longitudinally and laterally arranged a basic pattern remotest from any basic pattern including a pixel assigned a number after the second assignment step has been performed, and assigning a subsequent number to a pixel adjacent to a pixel in that basic pattern that is assigned a number, repeatedly to assign in said basic dither pattern a number indicating an order to be followed to illuminate a dot.

13. An image processing apparatus using dithering to represent shades, comprising
a storage portion storing a basic dither pattern configured of a plurality of basic patterns; and
a dithering unit using said basic dither pattern to dither image data, wherein
said plurality of basic patterns each including a plurality of pixels,
said basic dither pattern has each pixel assigned a number indicating an order to be followed to illuminate a dot in a dither matrix,
a single pixel in one of said plurality of basic patterns is assigned an initial value of said number, and
subsequently when said basic patterns are arranged longitudinally and laterally a basic pattern remotest from any pixel assigned a number is selected in order and a pixel in that selected basic pattern is assigned a subsequent number.

14. The apparatus of claim 13, wherein in said basic pattern a number indicating an order to be followed to illuminate a dot is assigned to allow the dither matrix to be a dither matrix of dot convergence type.

15. The apparatus of claim 13, further comprising a table storage portion storing a table correlating a shade of said image data to a shade in a basic dither pattern, wherein said dithering unit uses said basic dither pattern and said table to dither image data.

16. The apparatus of claim 15, further comprising an image forming unit forming an image based on image data dithered by said dithering unit.

17. The apparatus of claim 16, further comprising;
a detector detecting a density of a pattern formed by said image forming unit; and
a table modification portion driven by the density detected by said detector to modify said table.

18. An image processing method employing dithering, comprising the steps of:
employing a basic dither pattern capable of representing a first number of shades;
associating a shade of a second number of shades with a shade of the first number of shades, wherein the second number of shades is smaller than the first number of shades;

storing the associated shades in a table;

detecting in said table an amount of variation in a density value of each shade of the first number of shades relative to the amount of variation of each associated shade of the second number of shades; and modifying the correspondence of the associated shade of the second number of shades and the shade of the first number of shades in the table based on the results of the detecting step.

19. An image processing program stored on a computer-readable medium for causing a computer to perform an image process employing dithering, the program causing the computer to perform the steps of:

employing a basic dither pattern capable of representing a first number of shades;

associating a shade of a second number of shades with a shade of the first number of shades, wherein the second number of shades is smaller than the first number of shades;

storing the associated shades in a table;

detecting in said table an amount of variation in a density value of each shade of the first number of shades relative to the amount of variation of each associated shade of the second number of shades; and modifying the correspondence of the associated shade of the second number of shades and the shade of the first number of shades in the table based on the results of the detecting step.

20. An image processing apparatus using dithering to represent shades, comprising:

a dither pattern storage portion for storing a basic dither pattern capable of representing a first number of shades;

a table storage portion for storing a table in which a shade of a second number of shades is associated with a shade of the first number of shades, wherein the second number of shades is smaller than the first number of shades;

a detection portion for detecting in said table an amount of the variation in a density value of each shade of the first number of shades relative to the amount of variation of each associated shade of the second number of shades; and a table modification portion for modifying the correspondence of the associated shade of the second number of shades and the shade of the first number of shades in the table based on the results of the detection by the detection portion.

21. An image processing method employing dithering, comprising the steps of :

employing a basic dither pattern capable of representing a first number of shades;

associating a shade of a second number of shades with a shade of said first number of shades, wherein the second number of shades is smaller than the first number of shades;

storing the associated shades in a table;

referring to said table to obtain a shade of said first number of shades that corresponds to a predetermined shade of said second number of shades, applying the obtained shade to print a density detection pattern;

measuring the density values of printed density detection pattern with a sensor;

modifying the value of the output of said sensor in accordance with said predetermined shade; and employing the modified value of the output of said sensor to modify a correspondence in said table.

22. An image processing program stored on a computer-readable medium for causing a computer to perform an image process employing dithering, the program causing the computer to perform the steps of:

employing a basic dither pattern capable of representing a first number of shades;

associating a shade of a second number of shades with a shade of said first number of shades, wherein the second number of shades is smaller than the first number of shades;

storing the associated shades in a table;

referring to said table to obtain a shade of said first number of shades that corresponds to a predetermined shade of said second number of shades, applying the obtained shade to print a density detection pattern;

measuring the density values of printed density detection pattern with a sensor;

modifying the value of the output of said sensor in accordance with said predetermined shade; and employing the modified value of the output of said sensor to modify a correspondence in said table.

23. An image processing apparatus using dithering to represent shades, comprising:

a dither pattern storage portion for storing a basic dither pattern capable of representing a first number of shades;

a table storage portion for storing a table in which a shade of a second number of shades is associated with a shade of said first number of shades, wherein the second number of shades is smaller than the first number of shades;

a density measurement portion for referring to said table to obtain a shade of said first number of shades that corresponds to a predetermined shade of said second number of shades, applying the obtained shade to print a density detection pattern, and measuring the density values of a printed density detection pattern with a sensor; and a table modification portion for modifying the value of the output of said sensor in accordance with said predetermined shade, and employing the modified value of the output of said sensor to modify a correspondence in said table.

* * * * *

UNITED STATES PATENT AND TRADEMARK OFFICE
CERTIFICATE OF CORRECTION

| | |
|---|---|
| PATENT NO. | : 7,187,387 B2 |
| APPLICATION NO. | : 10/673272 |
| DATED | : March 6, 2007 |
| INVENTOR(S) | : Satoshi Deishi |

It is certified that error appears in the above-identified patent and that said Letters Patent is hereby corrected as shown below:

Claim 10, at column 11, lines 52-53, change:
"An image processing program product causing a computer to"

To now read as:
--An image processing program product stored on a computer-readable medium for causing a computer to--

Signed and Sealed this

Tenth Day of July, 2007

JON W. DUDAS
*Director of the United States Patent and Trademark Office*